(12) United States Patent
Greenside et al.

(10) Patent No.: US 7,140,801 B2
(45) Date of Patent: Nov. 28, 2006

(54) PRE-LOADING LATCH

(75) Inventors: Michael J. Greenside, City Granite Bay, CA (US); Alisa C. Sandoval, City Grass Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 43 days.

(21) Appl. No.: 10/646,005

(22) Filed: Aug. 22, 2003

(65) Prior Publication Data

US 2005/0042026 A1    Feb. 24, 2005

(51) Int. Cl.
*E05C 3/04* (2006.01)
*H05K 5/00* (2006.01)

(52) U.S. Cl. .................. 403/322.4; 361/726; 361/732; 361/747; 361/759; 292/241

(58) Field of Classification Search ................ 403/350, 403/374.2, 409.1; 312/222; 361/726, 732, 361/740, 747, 759, 725, 727, 741; 292/240, 292/241, 341.13, 341.14, 341.15, 341.17; 439/64, 160, 296; 248/680–681
See application file for complete search history.

(56) References Cited

U.S. PATENT DOCUMENTS

| | | | | |
|---|---|---|---|---|
| 4,830,530 A | * | 5/1989 | Meineke | 403/12 |
| 5,230,542 A | * | 7/1993 | Wiese | 292/340 |
| 5,293,303 A | * | 3/1994 | Fletcher et al. | 361/798 |
| 6,078,504 A | * | 6/2000 | Miles | 361/727 |
| 6,297,955 B1 | * | 10/2001 | Frank et al. | 361/686 |
| 6,654,253 B1 | * | 11/2003 | DiMarco | 361/730 |

* cited by examiner

*Primary Examiner*—Jack W. Lavinder

(57) ABSTRACT

A latch is designed to attain and keep full engagement of a sub-assembly in a chassis and to increase the reliability and longevity of connectors by increasing the chances that they remain fully engaged even in the presence of shock and vibration.

23 Claims, 4 Drawing Sheets

PRE-LOADING LATCH

BACKGROUND

Some electronic module sub-assemblies need to be inserted into a chassis and then be connected and fully mated with a chassis-mounted connector. Examples of such sub-assemblies are power supplies, RAID disks, peripheral devices, fan assemblies, and processors, all of which require a power connection of some sort. When these sub-assemblies have a power connection there is a requirement for sufficient surface contact (barrel contact) to insure adequate performance. Sufficient surface contact is only accomplished and assured with a fully mated or almost fully mated connector.

Providing for full connector insertion of power connectors (pre-loading) is of vital importance when preventing power failures as is maintaining the fully loaded connection during service. If a power connector loosens or begins to back out and there is less and less surface contact, the power connection and the connector itself may eventually fail. Consequently, yield (longevity and service life of the connector and thus any product) is compromised by a non-fully inserted power connector.

For purposes of quality and safety, and especially with high voltage, one typically uses an injector tool when inserting a sub-assembly into a chassis, usually then securing the sub-assembly with a lock of some kind and a mounting screw or two.

Previous solutions include securing screws, locking inserter/ejector levers, and simple locking mechanisms (like a door handle).

Securing screws can be used to provide enough pre-load to ensure fully mated connectors. The problem is they are often numerous in number and are subject to stripping or cross threading due to alignment problems. There are also tolerance problems in getting the threads started. The screw stripping, screw binding, and screw damage sometimes leaves metal particles and slivers that can short electronics near the failure. Furthermore, since the screws are not initially attached to the chassis or sub-assembly, they can be easily lost or misplaced. Sometimes when this happens, a sub-assembly is secured with less than the full number of required screws, and the connection is either not as complete as it needs to be initially or is prone to earlier failure.

Inserter/ejector levers themselves are adequate to fully engage a connector pair at time of insertion. The problem is that they generally cannot provide enough pre-loading to overcome extended field shock and vibration, especially in the telecom environment. Furthermore, they generally cannot maintain full engagement during fragility operations such as transportation and shipping because there is no pre-loading spring action.

Simple locking mechanisms do not provide any pre-load, and thus are inadequate for powered sub-assemblies, especially when the service environment includes shocks and vibrations.

SUMMARY

Generally, the present invention specifies a latch designed to attain and keep full engagement of a sub-assembly in a chassis. Such a latch increases the reliability and longevity of connectors by increasing the chances that they remain fully engaged even in the presence of shock and vibration.

DESCRIPTION OF THE INVENTION

In one embodiment of the present invention the inserter/ejector tool is a latch that is part of the sub-assembly. The latch tool is attached to the sub-assembly and is captive and so is not easily lost or misplaced. This pre-loading power latch is a sheet metal plate incorporating a thumb or standard screw operable to attach the latch to the sub-assembly. The latch and the latch screw are always loosely attached to the sub-assembly and cannot be removed and are rigidly attached to the chassis on completion of an insertion operation.

Figure 1:
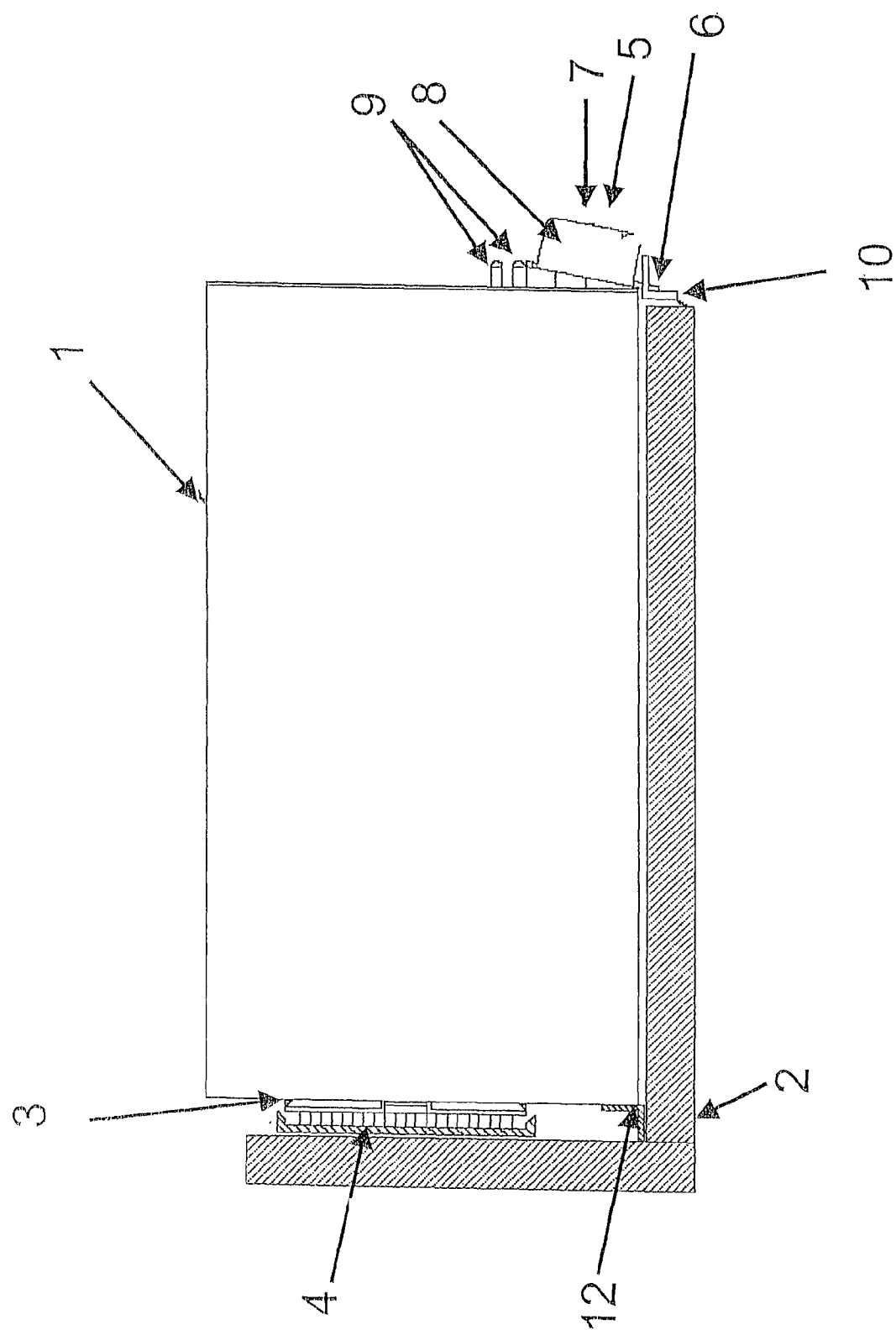
FIG. 1 is a block diagram of an embodiment of the invention showing a sub-assembly being inserted into a chassis and being secured with a latch.

Referring to FIG. 1, in this embodiment of the invention, a component or sub-assembly, such as a power supply, 1 is inserted into a chassis 2. There is a sub-assembly connector 3 at the rear of the sub-assembly 1 and a chassis connector 4 attached to the inside of the back of the chassis 2. As the power supply is inserted into the chassis 2, the sub-assembly connector 3 mates with the chassis connector 4.

A latch 5 is loosely attached to the front of the sub-assembly 1. A latch bracket 10 with a slot (not shown in FIG. 1) is rigidly attached to the front of the chassis 2. As the sub-assembly 1 is pushed into the chassis 2, one typically feels resistance as the sub-assembly connector 3 is inserted into the chassis connector 4.

A latch screw 7 is tightened into the chassis 2, and the latch 5 is rotated from an open position to a closed position. The latch screw 7 and the latch 5 rotate independently from each other. A latch lip 6 is moved into the latch slot (not shown in FIG. 1) on the latch bracket 10 by a counter-clockwise rotation. A latch guide 8 stops the latch 5 from rotating any more than ninety degrees counter-clockwise as the latch screw 7 is tightened further. The latch guide 8 also serves to ensure the lap lip 6 is centered in the latch slot (not shown in FIG. 1) as the latch screw 7 continues to be tightened.

Still referring to FIG. 1, the power latch 5 starts a pre-loading process with the latch lip 6 in the latch slot (not shown in FIG. 1) at a slight angle as shown. Once the latch lip 6 is in place and the latch screw 7 is further tightened, the latch 5 attempts to straighten itself. As the latch 5 straightens, the latch lip 6 pushes against the outside edge of the latch slot (not shown in FIG. 1) in the latch bracket 10. This causes a moment inward and, when seated, pre-loads the sub-assembly connector 3 and the chassis connector 4. That is, straightening the latch 5 causes the connectors 3 and 4 to be fully mated.

In one embodiment of the invention, the latch guide pins 9 are for use during an ejection operation to keep the latch 5 from rotating more than ninety degrees clockwise as the latch screw 7 is loosened. The combination of the latch guide 8 and the latch guide pins 9 keeps the latch 5 from rotating any more than ninety degrees.

In another embodiment of the invention, a stop mechanism 12 is attached to the chassis 2. The stop mechanism 12 is optional and inclusion in a particular embodiment depends upon tolerance and connector robustness. The stop mechanism 12 consists of a block of material such as plastic or metal located near the mating connectors 3 and 4, and is present to keep the sub-assembly 1 from exerting too much force on the connectors 3 and 4.

Figure 2:
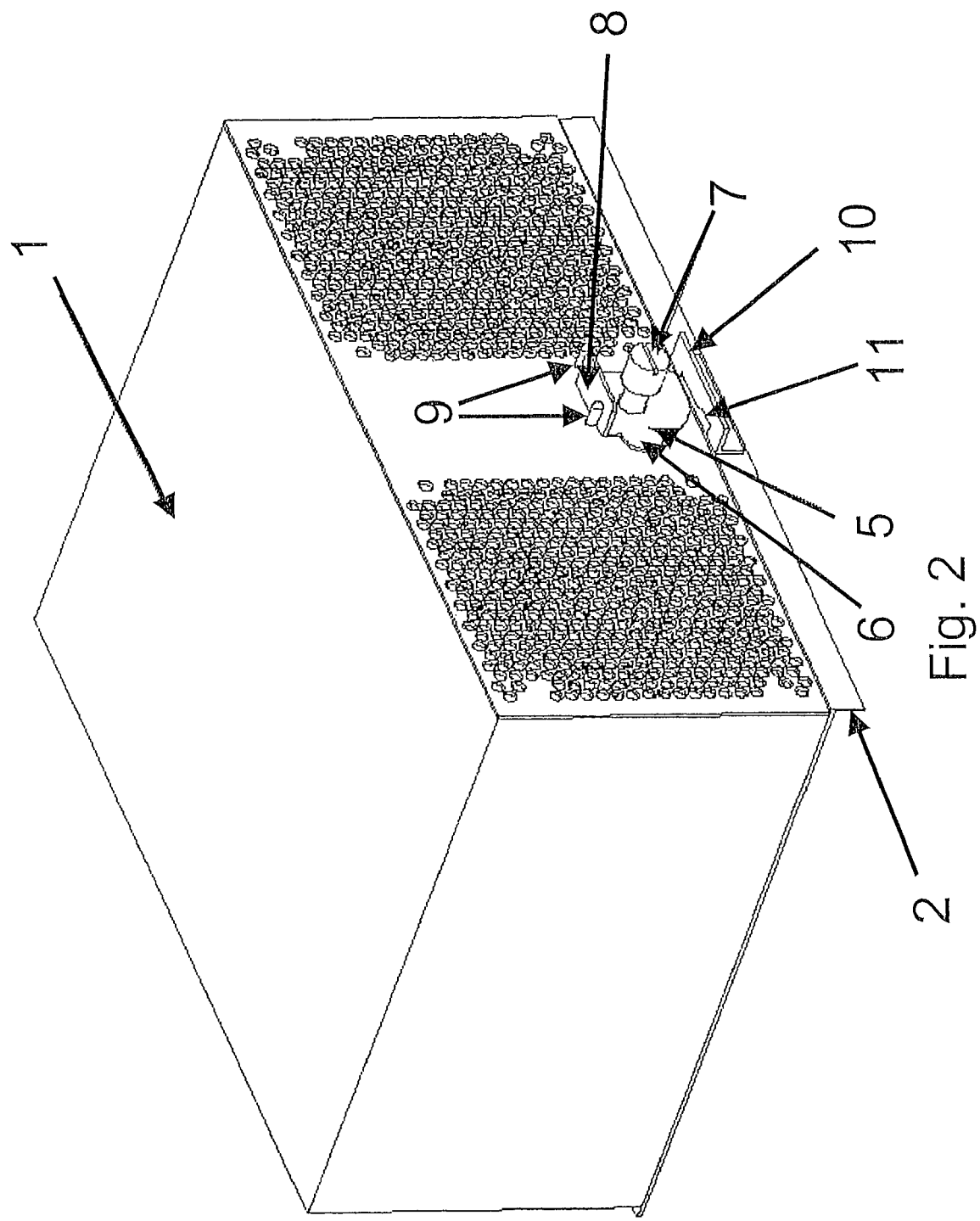
FIG. 2 is a block diagram of the front of the sub-assembly of FIG. 1 showing the components of the latch in an open position according to an embodiment of the invention.

Referring to FIG. 2, the latch 5 of FIG. 1 is shown in an open position. The latch guide 8 is against the latch guide pins 9. This prevents the latch 5 from rotating any further in the clockwise direction during an ejection operation. The latch lip 6 is not engaged in the latch slot 11 on the latch bracket 10, so there is no pre-loading. The sub-assembly 1 is unlatched and thus set either to be completely removed from the chassis 2 or to be subsequently latched to the chassis 2.

Figure 3:
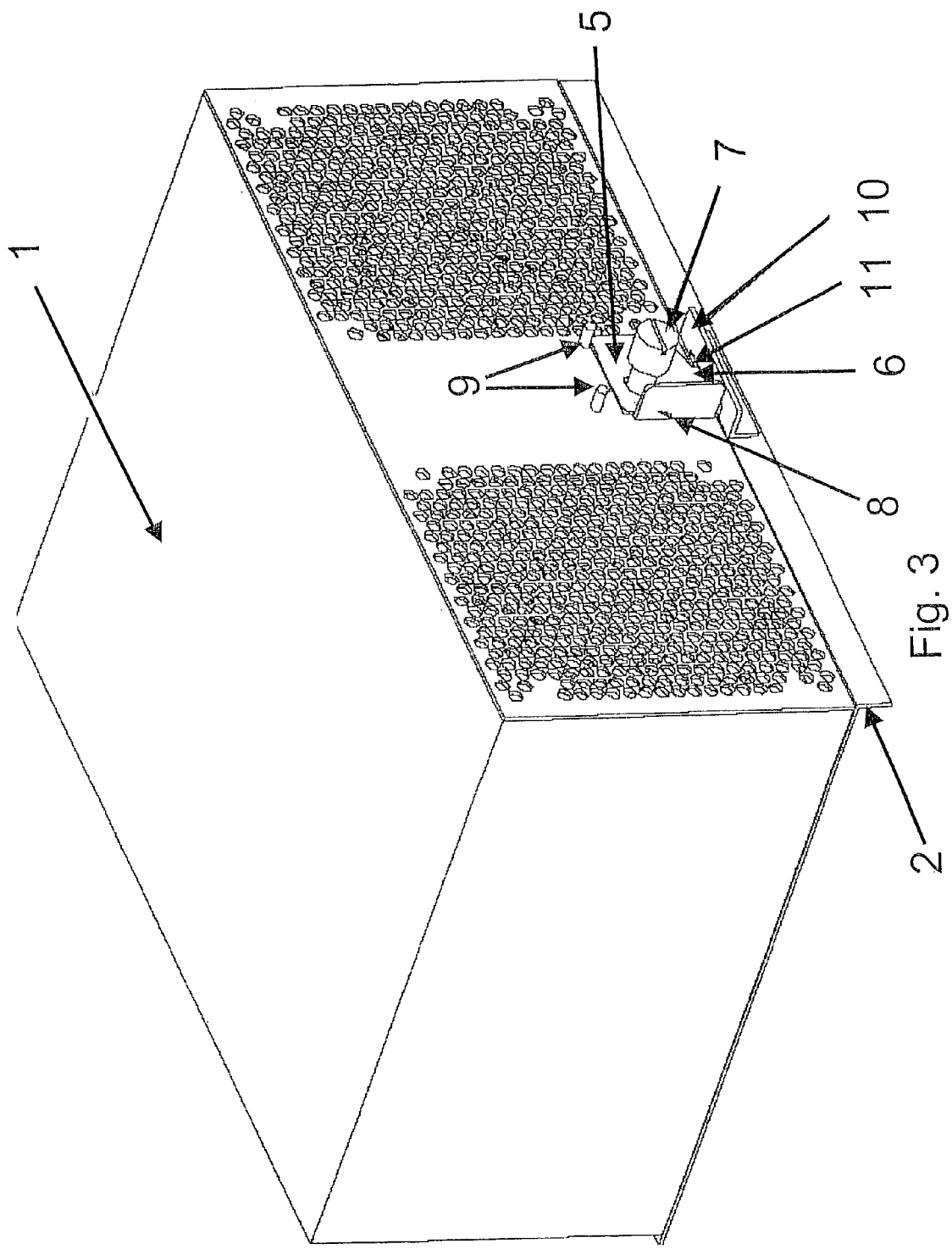
FIG. 3 is a block diagram of the front of the sub-assembly of FIG. 1 showing the components of the latch in a closed position according to an embodiment of the invention.

Referring to FIG. 3, the latch 5 of FIGS. 1 and 2 is shown in a closed position. The latch guide 8 is against the latch bracket 10. This prevents the latch 5 from rotating any further in the counter-clockwise direction during an insertion operation. This also ensures the latch lip 6 is engaged in the center of the latch slot 11 on the latch bracket 10 so that there is maximum or near-maximum pre-loading. The sub-assembly 1 is latched to the chassis 2 and pre-loading is maximized as the latch screw 7 is tightened.

Figure 4:
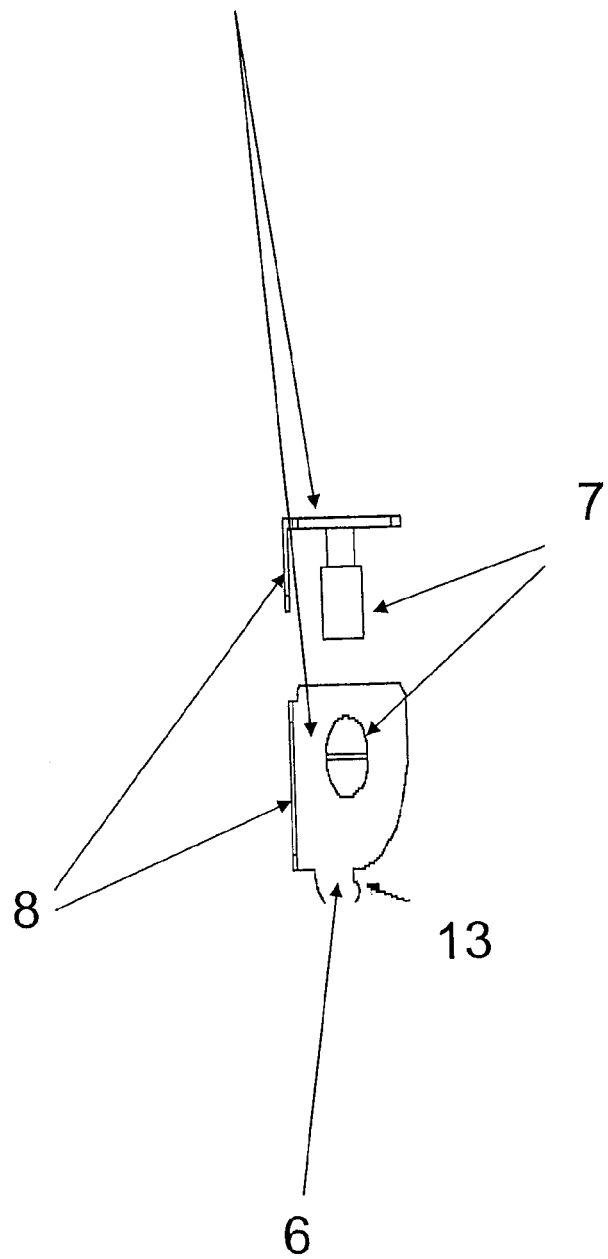
FIG. 4 is a top and front view of a latch with a keying lock according to an embodiment of the invention.

Referring to FIG. 4, the latch 5 of FIGS. 1–3 is shown in a top and a front view with a latch lip keying lock 13 on the latch lip 6 according to an embodiment of the invention. The latch lip keying lock 13 prevents the sub-assembly 1 (FIG. 1) from moving up or down after the latch 5 is closed and secured by the latch screw 7. Since the latch 5 prevents horizontal movement of the sub-assembly and the latch lip keying lock 10 prevents vertical movement of the sub-assembly, the sub-assembly is securely attached to the chassis 2 (FIG. 1).

In another embodiment of the invention, inserter/ejector levers can be used in conjunction with a power latch depending on the insertion force required to overcome the mating force of the connectors.

It is envisioned that any electronic chassis with sub-assemblies and a power requirement could use this invention. This includes sound production and reproduction systems and media production and reproduction systems in general.

It is also envisioned that any module in a computer could use this invention with or without an insertion/extraction lever and with or without a stop mechanism.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A latch, comprising:
   a first member operable to be attached to a chassis and defining a slot, the chassis having a first connector; and
   a second member operable to be attached to a subassembly that is installable in the chassis and includes a second connector, the second member having a lip and operable to rotate about an axis to engage the slot with the lip, wherein the slot is located a distance away from the axis and has a length less than the circumference of a circle centered on the axis and having a radius equal to the distance, and wherein engagement of the slot with the lip causes the second connector to move in a direction toward the first connector, the axis being substantially oriented along the direction.

2. The latch of claim 1 wherein the second member defines a hole that is operable to receive a fastener that attaches the second member to the sub assembly.

3. The latch of claim 1 wherein the second member defines a hole that is operable to receive a screw that attaches the second member to the sub assembly.

4. The latch of claim 1 wherein:
   the second member defines a hole that is operable to receive a fastener that attaches the second member to the subassembly; and
   the second member is operable to rotate about the fastener.

5. The latch of claim 1 wherein the second member includes a latch guide that is operable to prevent the second member from rotating beyond a predetermined position by engaging the first member.

6. The latch of claim 1, further comprising:
   a guide member operable to be attached to the subassembly; and
   wherein the second member includes a latch guide that is operable to prevent the second member from rotating beyond a predetermined position by engaging the guide member.

7. The latch of claim 1 wherein:
   the slot has an edge; and
   the lip has a notch operable to engage the edge when the lip engages the slot.

8. A sub-assembly installable in a chassis having a first connector and a first latch member that defines a slot, the sub-assembly comprising:
   a side;
   a second connector; and
   a second latch member attached to the side, having a lip, and operable to rotate about an axis to engage the slot with the lip, wherein the slot is located a distance away from the axis and has a length less than the circumference of a circle centered on the axis and having a radius equal to the distance, and wherein engagement of the slot with the lip causes the second connector to move in a direction toward the first connector, the axis being substantially oriented along the direction.

9. The subassembly of claim 8, further comprising:
   wherein the side defines a first hole;
   wherein the second member defines a second hole; and
   a screw that extends through the second hole and into the first hole to rotatably attach the second member to the side.

10. The sub-assembly of claim 8, further comprising:
    a guide member attached to a side; and
    wherein the second member includes a latch guide that is operable to prevent the second member from rotating beyond a predetermined position by engaging the guide member.

11. A system, comprising:
    a chassis having a receptacle and a first connector;
    a first latch member attached to the chassis adjacent to the receptacle and defining a slot;
    a subassembly having a second connector and disposed in the receptacle; and
    a second latch member attached to the subassembly, having a lip, and operable to rotate about an axis to engage the slot with the lip, wherein the slot is located a distance away from the axis and has a length less than the circumference of a circle centered on the axis and having a radius equal to the distance, and wherein engagement of the slot with the lip causes the second connector to move in a direction toward the first connector, the axis being substantially oriented along the direction.

12. The system of claim 11 wherein the second connector is operable to mate with the first connector when the lip engages the slot.

13. The system of claim 11, further comprising:
wherein the subassembly defines a first hole:
wherein the second latch member defines a second hole; and
a screw that extends through the second hole and into the first hole and that forces the first connector to mate with the second connector when the screw is tightened and the lip engages the slot.

14. The system of claim 11, further comprising:
wherein the receptacle has a rear; and
a stop disposed in the receptacle and operable to maintain a minimum predetermined distance between the subassembly and the rear of the receptacle.

15. The system of claim 11, further comprising:
wherein the receptacle has a rear; and
a stop attached to the subassembly and operable to maintain a minimum predetermined distance between the subassembly and the rear of the receptacle.

16. A method, comprising:
inserting a subassembly having a first connector into a chassis having a second connector;
rotating a first latch member disposed on the subassembly about an axis; and
engaging a lip of the first latch member with a slot of a second latch member disposed on the chassis, wherein the slot is located a distance away from the axis and has a length less than the circumference of a circle centered on the axis and having a radius equal to the distance, and wherein engagement of the slot with the lip causes the second connector to move in a direction toward the first connector, the axis being substantially oriented along the direction.

17. The method of claim 16 wherein the first connector mates with the second connector.

18. The method of claim 16, further comprising tightening a screw that attaches the first latch member to the subassembly after engaging the lip with the slot.

19. A latch comprising:
a first member operable to be attached to a chassis and defining a slot, the chassis having a first connector; and
a second member operable to be attached to a subassembly that is installable in the chassis and includes a second connector, the second member having a lip and operable to rotate about an axis to engage the slot with the lip, wherein engagement of the slot with the lip causes the second connector to move in a direction toward the first connector, the axis being substantially oriented along the direction; and
wherein the second member includes a latch guide that is operable to prevent the second member from rotating beyond a predetermined position by engaging the first member.

20. A latch comprising:
a first member operable to be attached to a chassis and defining a slot, the chassis having a first connector;
a second member operable to be attached to a subassembly that is installable in the chassis and includes a second connector, the second member having a lip and operable to rotate about an axis to engage the slot with the lip, wherein engagement of the slot with the lip causes the second connector to move in a direction toward the first connector, the axis being substantially oriented along the direction; and
wherein the slot has an edge and the lip has a notch operable to engage the edge when the lip engages the slot.

21. A subassembly installable in a chassis having a first connector and a first latch member that defines a slot, the subassembly comprising:
a side;
a second connector;
a second latch member attached to the side, having a lip, and operable to rotate about an axis to engage the slot with the lip, wherein engagement of the slot with the lip causes the second connector to move in a direction toward the first connector, the axis being substantially oriented along the direction;
a guide member attached to the side; and
wherein the second member includes a latch guide that is operable to prevent the second member from rotating beyond a predetermined position by engaging the guide member.

22. A system, comprising:
a chassis having a receptacle and a first connector;
a first latch member attached to the chassis adjacent to the receptacle and defining a slot;
a subassembly having a second connector and disposed in the receptacle;
a second latch member attached to the subassembly, having a lip, and operable to rotate about an axis to engage the slot with the lip, wherein engagement of the slot with the lip causes the second connector to move in a direction toward the first connector, the axis being substantially oriented along the direction; and
wherein the receptacle has a rear; and a stop disposed in the receptacle and operable to maintain a minimum predetermined distance between the subassembly and the rear of the receptacle.

23. A latch comprising:
a first member operable to be attached to a chassis and defining a linear slot, the chassis having a first connector; and
a second member operable to be attached to a subassembly that is installable in the chassis and includes a second connector, the second member having a lip and operable to rotate about a shaft to engage the slot with the lip, wherein engagement of the slot with the lip causes the second connector to move in a direction toward the first connector, the shaft being substantially oriented along the direction.

* * * * *